(12) United States Patent
Van Horn et al.

(10) Patent No.: US 9,404,678 B2
(45) Date of Patent: Aug. 2, 2016

(54) USE OF R-1233 IN LIQUID CHILLERS

(71) Applicant: Arkema Inc., King of Prussia, PA (US)

(72) Inventors: Brett L. Van Horn, King of Prussia, PA (US); Philippe Bonnet, Lyons (FR); Laurent Abbas, Narberth, PA (US)

(73) Assignee: Arkema Inc., King of Prussia, PA (US)

( * ) Notice: Subject to any disclaimer, the term of this patent is extended or adjusted under 35 U.S.C. 154(b) by 51 days.

(21) Appl. No.: 14/188,986

(22) Filed: Feb. 25, 2014

(65) Prior Publication Data

US 2014/0165626 A1   Jun. 19, 2014

Related U.S. Application Data

(63) Continuation-in-part of application No. 12/667,136, filed as application No. PCT/US2009/036268 on Mar. 6, 2009, now Pat. No. 8,703,690.

(60) Provisional application No. 61/034,513, filed on Mar. 7, 2008.

(51) Int. Cl.
  *C11D 7/50* (2006.01)
  *F25B 1/00* (2006.01)
  (Continued)

(52) U.S. Cl.
  CPC . *F25B 1/005* (2013.01); *C09K 3/30* (2013.01); *C09K 5/044* (2013.01); *C09K 5/045* (2013.01); *C10M 171/008* (2013.01); *F25B 45/00* (2013.01); *C09K 2205/112* (2013.01); *C09K 2205/122* (2013.01); *C09K 2205/126* (2013.01); *C09K 2205/32* (2013.01); *C10M 2203/1006* (2013.01); *C10M 2205/028* (2013.01); *C10M 2205/223* (2013.01); *C10M 2207/2835* (2013.01); *C10M 2209/043* (2013.01); *C10M 2209/1033* (2013.01);
  (Continued)

(58) Field of Classification Search
  CPC .............................. C11D 7/5018; F25B 39/02
  See application file for complete search history.

(56) References Cited

U.S. PATENT DOCUMENTS 4,829,786 A * 5/1989 Sand ..................... F25B 1/047
                                                          184/109
5,632,154 A * 5/1997 Sibik .................... F25B 41/062
                                                          165/292

(Continued)

FOREIGN PATENT DOCUMENTS

GB         652162       4/1951
JP         7063444 A    8/1993
(Continued)

OTHER PUBLICATIONS

McQuay International, "Centrifugal Chiller Fundamentals", Application Guide AG 31-002 (1996) pp. 2-19.
(Continued)

*Primary Examiner* — Gregory Webb
(74) *Attorney, Agent, or Firm* — Steven D. Boyd

(57) ABSTRACT

This invention relates to the use of chloro-trifluoropropenes as refrigerants in negative-pressure liquid chillers and methods of replacing an existing refrigerant in a chiller with chloro-trifluoropropenes. The chloro-trifluoropropenes, particularly 1-chloro-3,3,3-trifluoropropene, have high efficiency and unexpectedly high capacity in liquid chiller applications and are useful as more environmentally sustainable refrigerants for such applications, including the replacement of R-123 and R-11.

25 Claims, 5 Drawing Sheets

(51) Int. Cl.
*C09K 5/04* (2006.01)
*C09K 3/30* (2006.01)
*C10M 171/00* (2006.01)
*F25B 45/00* (2006.01)

(52) U.S. Cl.
CPC .... *C10N 2220/301* (2013.01); *C10N 2220/302* (2013.01); *C10N 2220/303* (2013.01); *C10N 2220/305* (2013.01); *F25B 2400/18* (2013.01)

(56) References Cited

U.S. PATENT DOCUMENTS

| | | | |
|---|---|---|---|
| 5,710,352 A | 1/1998 | Tung | |
| 6,293,112 B1 * | 9/2001 | Moeykens | F25B 39/02 165/115 |
| 6,516,837 B2 | 2/2003 | Thomas et al. | |
| 6,962,665 B2 | 11/2005 | Mahler | |
| 6,991,744 B2 | 1/2006 | Mahler et al. | |
| 7,276,177 B2 | 10/2007 | Minor et al. | |
| 7,413,675 B2 | 8/2008 | Minor | |
| 7,442,321 B1 | 10/2008 | Chen et al. | |
| 7,674,756 B2 * | 3/2010 | Johnson | C11D 3/43 510/177 |
| 7,833,433 B2 | 11/2010 | Singh et al. | |
| 7,914,696 B2 * | 3/2011 | Low | C08J 9/146 134/36 |
| 7,935,268 B2 | 5/2011 | Basu et al. | |
| 8,333,901 B2 * | 12/2012 | Low | C06Q 99/00 134/34 |
| 8,574,451 B2 | 11/2013 | Hulse et al. | |
| 2002/0143215 A1 * | 10/2002 | Tung | C07C 17/087 570/161 |
| 2005/0263737 A1 | 12/2005 | Minor et al. | |
| 2006/0266976 A1 | 11/2006 | Minor et al. | |
| 2007/0007488 A1 | 1/2007 | Singh et al. | |
| 2007/0187638 A1 | 8/2007 | Guilpain et al. | |
| 2007/0284078 A1 | 12/2007 | Leck et al. | |
| 2007/0284555 A1 | 12/2007 | Leck et al. | |
| 2008/0098755 A1 * | 5/2008 | Singh | C07C 19/08 62/119 |
| 2008/0157022 A1 | 7/2008 | Singh et al. | |
| 2009/0305876 A1 | 12/2009 | Singh et al. | |
| 2010/0101245 A1 * | 4/2010 | Bivens | C09K 5/045 62/77 |
| 2010/0102273 A1 | 4/2010 | Basu et al. | |
| 2011/0001080 A1 | 1/2011 | Van Horn et al. | |
| 2013/0283832 A1 | 10/2013 | Kujak et al. | |

FOREIGN PATENT DOCUMENTS

| | | |
|---|---|---|
| WO | WO 98/12161 | 3/1998 |
| WO | WO 2005/067554 | 7/2005 |
| WO | WO 2006/012095 A2 | 2/2006 |
| WO | WO 2007/002625 A2 | 1/2007 |
| WO | WO2008/006866 A1 | 1/2008 |
| WO | WO2010/077898 A2 | 7/2010 |
| WO | WO2013/093479 A1 | 6/2013 |

OTHER PUBLICATIONS

Bivens, et al., "Alternative Refrigerants for Building Air Conditioning", Proceedings of Tenth Symposium on Improving Building Systems in Hot and Humid Climates DuPont Fluoroproducts, Wilmington DE., (1996) pp. 289-295.

* cited by examiner

USE OF R-1233 IN LIQUID CHILLERS

This application is a Continuation-In-Part of U.S. application Ser. No. 12/667,136 filed Dec. 29, 2009, which claims priority to International Application serial number PCT/US09/36268 filed Mar. 6, 2009, which claims priority to U.S. Provisional Application Ser. No. 61/034,513 filed Mar. 7, 2008, all incorporated herein by reference.

FIELD OF THE INVENTION

This invention relates to the use of chloro-trifluoropropenes as refrigerants in negative-pressure liquid chillers. The chloro-trifluoropropenes, particularly 1-chloro-3,3,3-trifluoropropene, have high efficiency and unexpectedly high capacity in liquid chiller applications and are useful as more environmentally sustainable refrigerants for such applications, including the replacement of R-123 and R-11. The chloro-trifluoropropenes can be used in new chiller applications or as a top-off or retrofit where the refrigerant is removed from an existing chiller and the chloro-trifluoropropenes of the present invention are added.

BACKGROUND OF THE INVENTION

With continued regulatory pressure there is a growing need to identify more environmentally sustainable replacements for refrigerants, heat transfer fluids, foam blowing agents, solvents, and aerosols with lower ozone depleting and global warming potentials. Chlorofluorocarbon (CFC) and hydrochlorofluorocarbons (HCFC), widely used for these applications, are ozone depleting substances and are being phased out in accordance with guidelines of the Montreal Protocol. Hydrofluorocarbons (HFC) are a leading replacement for CFCs and HCFCs in many applications; though they are deemed "friendly" to the ozone layer they still generally possess high global warming potentials. One new class of compounds that has been identified to replace ozone depleting or high global warming substances are halogenated olefins, such as hydrofluoroolefins (HFO) and hydrochlorofluoroolefins (HCFO). In the present invention, it was discovered that chloro-trifluoropropenes are particularly useful refrigerants liquid chiller systems, particularly in negative-pressure chiller systems, such as for the replacement of R-11 and R-123.

With continued regulatory pressure there is a growing need to identify more environmentally sustainable replacements for refrigerants, heat transfer fluids, foam blowing agents, solvents, and aerosols with lower ozone depleting and global warming potentials. Chlorofluorocarbon (CFC) and hydrochlorofluorocarbons (HCFC), widely used for these applications, are ozone depleting substances and are being phased out in accordance with guidelines of the Montreal Protocol. Hydrofluorocarbons (HFC) are a leading replacement for CFCs and HCFCs in many applications; though they are deemed "friendly" to the ozone layer they still generally possess high global warming potentials. One new class of compounds that has been identified to replace ozone depleting or high global warming substances are halogenated olefins, such as hydrofluoroolefins (HFO) and hydrochlorofluoroolefins (HCFO). The HFOs and HCFOs provide the low global warming potential and zero or near zero ozone depletion properties desired.

Chillers are refrigeration machines that cool water, other heat transfer fluids, or process fluids by a vapor-compression (modified reverse-Rankine), absorption, or other thermodynamic cycle. Their most common use is in central systems to air condition large office, commercial, medical, entertainment, residential high-rise, and similar buildings or clusters of buildings. Both large central and interconnected plants, generally with multiple chillers in each, are common for shopping centers, university, medical, and office campuses; military installations; and district cooling systems. The chilled water (or less commonly a brine or other heat-transfer fluid) is piped through the building or buildings to other devices, such as zoned air handlers, that use the cooled water or brine to air condition (cool and dehumidify) occupied or controlled spaces. By their nature, both efficiency and reliability are critical attributes of chillers. Chillers typically range in thermal capacity from approximately 10 kW (3 ton) to exceeding 30 MW (8,500 ton), with a more common range of 300 kW (85 ton) to 14 MW (4,000 ton). Larger systems typically employ multiple chillers, with some installations exceeding 300 NW (85,000 ton) of cooling. Liquid-chilling systems cool water, brine, or other secondary coolant for air conditioning or refrigeration. The system may be either factory-assembled and wired or shipped in sections for erection in the field. The most frequent application is water chilling for air conditioning although brine cooling for low temperature refrigeration and chilling fluids in industrial processes are also common.

The basic components of a vapor-compression, liquid-chilling system include a compressor, liquid cooler (evaporator), condenser, compressor drive, liquid-refrigerant expansion or flow control device, and control center; it may also include a receiver, economizer, expansion turbine, and/or, subcooler. In addition, auxiliary components may be used, such as a lubricant cooler, lubricant separator, lubricant-return device, purge unit, lubricant pump, refrigerant transfer unit, refrigerant vents, and/or additional control valves.

Liquid (usually water) enters the cooler, where it is chilled by liquid refrigerant evaporating at a lower temperature. The refrigerant vaporizes and is drawn into the compressor, which increases the pressure and temperature of the gas so that it may be condensed at the higher temperature in the condenser. The condenser cooling medium is warmed in the process. The condensed liquid refrigerant then flows back to the evaporator through an expansion device. Some of the liquid refrigerant changes to vapor (flashes) as pressure drops between the condenser and the evaporator. Flashing cools the liquid to the saturated temperature at evaporator pressure. It produces no refrigeration in the cooler. The following modifications (sometimes combined for maximum effect) reduce flash gas and increase the net refrigeration per unit of power consumption.

Subcooling. Condensed refrigerant may be subcooled below its saturated condensing temperature in either the subcooler section of a water-cooled condenser or a separate heat exchanger. Subcooling reduces flashing and increases the refrigeration effect in the chiller.

Economizing. This process can occur either in a direct expansion (DX), an expansion turbine, or a flash system, in a DX system, the main liquid refrigerant is usually cooled in the shell of a shell-and-tube heat exchanger, at condensing pressure, from the saturated condensing temperature to within several degrees of the intermediate saturated temperature. Before cooling, a small portion of the liquid flashes and evaporates in the tube side of the heat exchanger to cool the main liquid flow. Although subcooled, the liquid is still at the condensing pressure.

An expansion turbine extracts rotating energy as a portion of the refrigerant vaporizes. As in the DX system, the remaining liquid is supplied to the cooler at intermediate pressure. In a flash system, the entire liquid flow is expanded to intermediate pressure in a vessel that supplies liquid to the cooler at saturated intermediate pressure; however, the liquid is at intermediate pressure.

Flash gas enters the compressor either at an intermediate stage of a multistage centrifugal compressor, at the intermediate stage of an integral two-stage reciprocating compressor, at an intermediate pressure port of a screw compressor, or at the inlet of a high-pressure stage on a multistage reciprocating or screw compressor.

Liquid Injection. Condensed liquid is throttled to the intermediate pressure and injected into the second-stage suction of the compressor to prevent excessively high discharge temperatures and, in the case of centrifugal machines, to reduce noise. For screw compressors, condensed liquid is injected into a port fixed at slightly below discharge pressure to provide lubricant cooling.

Basic System

An exemplary refrigeration cycle of a basic liquid chiller system is shown in FIG. 1. Chilled water enters the cooler at 54° F., for example, and leaves at 44° F. Condenser water leaves a cooling tower at 85° F., enters the condenser, and returns to the cooling tower near 95° F. Condensers may also be cooled by air or evaporation of water. This system, with a single compressor and one refrigerant circuit with a water-cooled condenser, is used extensively to chill water for air conditioning because it is relatively simple and compact. The compressor can be a reciprocating, scroll, screw, or centrifugal compressor. The preferred systems of the present invention are centrifugal liquid chiller systems.

Liquid chiller systems can also be used to fulfill heating requirement through heat recovery. Heat recovery is the process of capturing the heat that is normally rejected from the chiller condenser and using it for space heating, domestic water heating, or another process requirement. For water-cooled chillers, it can be accomplished either by operating at higher condensing temperatures and recovering heat from the water leaving the standard condenser, or by using a separate condenser. It can also be done by recovering heat from the refrigerant using a heat exchanger, preferably between the compressor and the condenser. Heat recovery in air-cooled chiller necessarily involves recovering heat from the refrigerant. The preferred heat recovery systems of the present invention are heat recovery centrifugal chillers.

A centrifugal compressor uses rotating elements to accelerate the refrigerant radially, and typically includes an impeller and diffuser housed in a casing. Centrifugal compressors usually take fluid in at an impeller eye, or central inlet of a circulating impeller, and accelerate it radially outwardly. Some static pressure rise occurs in the impeller, but most of the pressure rise occurs in the diffuser section of the casing, where velocity is converted to static pressure. Each impeller-diffuser set is a stage of the compressor. Centrifugal compressors are built with from 1 to 12 or more stages, depending on the final pressure desired and the volume of refrigerant to be handled. A compressor with more than one stage is called a multistage compressor.

Centrifugal compressors may use lubricating oil or may be oil-free. An example of oil-free compressors is those with magnetic bearings, where the rotor shaft is levitated between magnetic bearings and is preferably rotated using a direct drive motor, particularly a permanent magnet direct drive motor. Another example of oil-free compressors is those using hybrid bearing systems without oil, such as those using ceramic rolling elements.

The pressure ratio, or compression ratio, of a compressor is the ratio of absolute discharge pressure to the absolute inlet pressure. Pressure delivered by a centrifugal compressor is practically constant over a relatively wide range of capacities. Therefore, in order to maintain the centrifugal compressor performance while replacing the existing refrigerant, the pressure ratio when using the new refrigerant should be as close as possible to that when using the existing refrigerant.

Unlike a positive displacement compressor, a centrifugal compressor depends entirely on the centrifugal force of the high speed impeller to compress the vapor passing through the impeller. There is no positive displacement, but rather what is called dynamic-compression.

The pressure a centrifugal compressor can develop depends on the tip speed of the impeller. Tip speed is the speed of the impeller measured at its tip and is related to the diameter of the impeller and its revolutions per minute. The capacity of the centrifugal compressor is determined by the size of the passages through the impeller. This makes the size of the compressor more dependent on the pressure required than the capacity.

In order to maintain the centrifugal compressor performance while replacing the existing refrigerant, the predetermined impeller Mach number should be the same as that achieved by the existing refrigerant. Since impeller Mach number is dependent upon the acoustic velocity (speed of sound) of refrigerant, the performance of a compressor can more accurately be maintained by formulating a replacement refrigerant which has the same acoustical velocity as the original refrigerant, or which has an acoustical velocity which theoretically will provide the same impeller Mach number as the existing refrigerant.

An important consideration for compressors, especially when replacing an existing refrigerant with a new one, is the dimensionless specific speed, $\Omega$, defined here as:

$$\Omega = \frac{\omega\sqrt{V}}{(\Delta h)^{3/4}}$$

where $\omega$ is the angular velocity (rad/s), V is the volume flow rate (m$^3$/s) and $\Delta h$ is the ideal specific work (J/kg) per compressor stage, which can be approximated as:

$$\Delta h = h_2 - h_1 - (s_2 - s_1)\frac{T_2 - T_1}{\ln(T_2/T_1)}$$

where the subscripts 1 and 2 denotes the gas state at the compressor inlet and outlet respectively. H, s, and T are respectively the specific enthalpy, specific entropy, and temperature. Compressors operate with the highest adiabatic efficiency, $\eta$, when the $\Omega$ has the optimum value for the design.

Because of its high speed operation, a centrifugal compressor is fundamentally a high volume, low pressure machine. A centrifugal compressor works best with a low pressure refrigerant, such as trichlorofluoromethane (CFC-11). When part of the chiller, particularly the evaporator, is operated with at a pressure level below ambient, the chiller is referred to as a negative pressure system. One of the benefits of a low pressure or negative pressure system is low leak rates. Refrigerant leaks are driven by pressure differentials, so lower pressures will result in lower leak rates than high pressure systems. Also, leaks in the system operating at below ambient pressure result in air being sucked into the equipment rather than refrigerant leaking out. While such operation requires a purge device to remove any air and moisture, monitoring the purge operation serves as a warning system for developing leaks.

SUMMARY OF THE INVENTION

In the present invention, it was discovered that chloro-trifluoropropenes are particularly useful refrigerants for liquid chiller systems, particularly in negative-pressure chiller systems, such as for the replacement of R-11 and R-123. The chloro-trifluoropropenes of the present invention were discovered to provide operating conditions comparable to current chiller refrigerants and also to be compatible with current chiller lubricants. The chloro-trifluoropropenes of the present invention are preferably 1-chloro-3,3,3-trifluoropropene and/or 2-chloro-3,3,3-trifluoropropene, and more preferably trans-1-chloro-3,3,3-trifluoropropene.

DETAILED DESCRIPTION OF THE INVENTION

Figure 1:
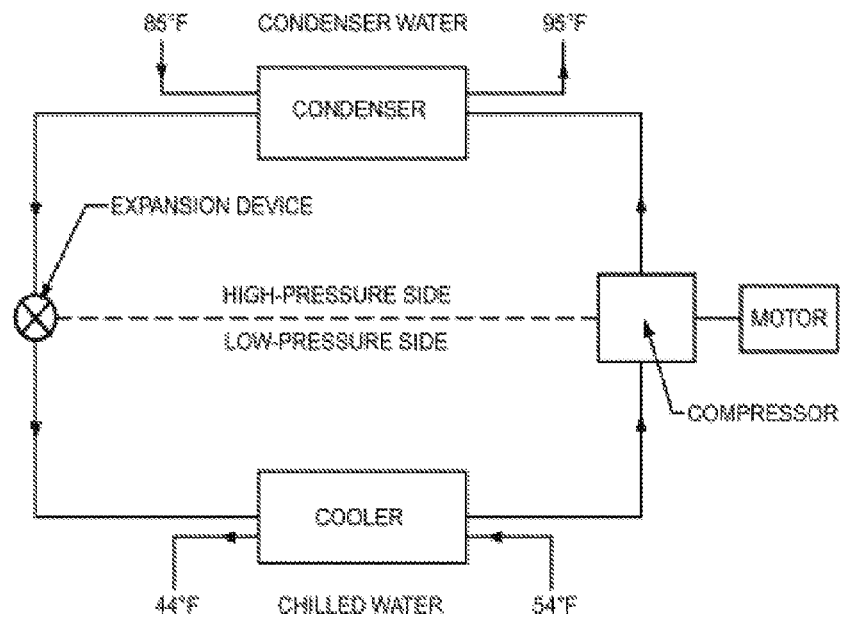
FIG. 1 is a schematic of a typical chiller system.

The chloro-trifluoropropene refrigerant composition of the present invention can be added to a new chiller system or be employed in a method of topping-off or retrofitting an existing chiller system. The chloro-trifluoropropene refrigerant composition of the present invention is particularly useful in chillers, preferably those operated at negative pressure, using centrifugal compressors and flooded evaporators. The retrofit method, comprises the steps of removing the existing refrigerant from the chiller system while optionally retaining a substantial portion of the lubricant in said system; and introducing to said system a composition comprising a chloro-trifluoropropene refrigerant of the present invention which is miscible with the lubricant present in the system without the need for addition surfactants and/or solubilizing agents. In topping-off an existing chiller system, the chloro-trifluoropropene refrigerant of the present invention is added to top-off a refrigerant charge or as a partial replacement either to replace refrigerant lost or after removing part of the existing refrigerant and then adding the chloro-trifluoropropene refrigerant of the present invention. The preferred chloro-trifluoropropene refrigerant of the present invention is preferably 1-chloro-3,3,3-trifluoropropene and/or 2-chloro-3,3,3-trifluoropropene, and more preferably trans-1-chloro-3,3,3-trifluoropropene.

As used herein, the term "substantial portion" refers generally to a quantity of lubricant which is at least about 50% (all percentages herein are by weight unless indicated otherwise) of the quantity of lubricant contained in the refrigeration system prior to removal of the prior refrigerant. Preferably, the substantial portion of lubricant in the system according to the present invention is a quantity of at least about 60% of the lubricant contained originally in the refrigeration system, and more preferably a quantity of at least about 70%.

Any of a wide range of known methods can be used to remove prior refrigerants from a chiller system while removing less than a major portion of the lubricant contained in the system. According to preferred embodiments, the lubricant is a hydrocarbon-based lubricant and the removal step results in at least about 90%, and even more preferably at least about 95%, of said lubricant remaining in the system. The removal step may readily be performed by pumping the original refrigerants in the gaseous state out of a refrigeration system containing liquid state lubricants, because refrigerants are quite volatile relative to traditional hydrocarbon-based lubricants. The boiling point of refrigerants are generally under 30° C. whereas the boiling point of mineral oils are generally over 200° C. Such removal can be achieved in any of a number of ways known in the art, including, the use of a refrigerant recovery system. Alternatively, a cooled, evacuated refrigerant container can be attached to the low pressure side of a refrigeration system such that the gaseous prior refrigerant is drawn into the evacuated container and removed. Moreover, a compressor may be attached to a refrigeration system to pump the prior refrigerant from the system to an evacuated container. In light of the above disclosure, those of ordinary skill in the art will be readily able to remove the prior refrigerants from chiller systems and to provide a refrigeration system comprising a chamber having therein a hydrocarbon-based lubricant and a chloro-tri fluoropropene refrigerant according to the present invention.

A method of the present invention comprises introducing to a chiller system, a composition comprising at least one chloro-trifluoropropene refrigerant of the present invention miscible with the lubricant present in the system, if a lubricant is used. The lubricants in the chiller system can be hydrocarbon lubricating oils, oxygenated lubrication oils or mixtures thereof.

An embodiment of the present invention is a chiller system comprising (1) a compressor, (2) at least one liquid cooler, (3) at least one condenser, and (4) a chloro-trifluoropropene refrigerant of the present invention. The compressor of said chiller system is preferably a centrifugal compressor. In an embodiment of the present invention, the compressor in the chiller system has from 1 to 12 stages, preferably 2 or 3 stages, even more preferably 2 stages. In an embodiment of the present invention, the compressor in the chiller system uses a lubricating oil. In another embodiment of the present invention, the compressor is an oil-free compressor, preferably an oil-free compressor using magnetic bearings or using hybrid bearings.

In another embodiment of the present invention, the compressor in the chiller system is an oil-free compressor where the chloro-trifluoropropene refrigerant of the present invention acts a lubricating agent. In an embodiment of the present invention, the liquid cooler in the chiller system is a flooded evaporator. In an embodiment of the present invention, the condenser in the chiller system is a water-cooled condenser. In another embodiment of the present invention, the condenser of the chiller system is an air-cooled condenser.

In another embodiment of the present invention, the chiller system is a heat recovery chiller system comprising (1) a compressor, (2) at least one liquid cooler, (3) one or more condensers, and (4) a chloro-trifluoropropene refrigerant of the present invention. In another embodiment of the present invention, the liquid cooler of the chiller system is preferably a flooded evaporator, with one portion operated at a pressure below atmospheric pressure. In another embodiment of the present invention, the chiller system is a heat recovery chiller system containing one or multiple water-cooled condensers, and heat is recovered from the water leaving one of the condensers. In another embodiment of the present invention, the chiller system is a heat recovery chiller system and the condenser of the heat recovery chiller system is a water-cooled condenser or air-cooled condenser and heat is recovered from the refrigerant. In another embodiment, the chiller system is a heat recovery chiller system where the compressor is a centrifugal compressor.

Another embodiment of the present invention is a process for producing heating in a heat recovery chiller system or heat-pump chiller. In an embodiment of the present invention, the liquid cooler of the chiller system in the method is preferably a flooded evaporator with one portion operated at a pressure below atmospheric pressure. In an embodiment of the present invention, at least one of the condensers of the chiller system in the method is preferably operated at temperatures ranging from about 26.7° C. (80° F.) to 60° C. (140° F.), preferably from about 29.4° C. (85° F.) to 55° C. (131° F.).

Another embodiment of the present invention is a method of producing cooling using the chiller system of the present invention. In an embodiment of the present invention, the method of producing cooling uses a liquid cooler of the chiller system which is preferably a flooded evaporator with one portion operated at a pressure below atmospheric pressure. In an embodiment of the present invention, the method of producing cooling uses a condenser of the chiller system that is preferably operated at temperatures ranging from about 26.7° C. (80° F.) 60° C. (140° F.), preferably from about 29.4° C. (85° F.) to 55° C. (131° F.).

In an embodiment of the present invention, the chloro-trifluoropropene refrigerant is 1-chloro-3,3,3-fluoropropene, which may comprise a mixture of the trans- and cis-isomers of 1-chloro-3,3,3-fluoropropene, preferably predominantly the trans-isomer, more preferably greater than 70 wt % of the trans-isomer, more preferably greater than 90 wt % of the trans-isomer, more preferably greater than 97 wt % of the trans-isomer, and even more preferably greater than 99 wt % of the trans-isomer. In another embodiment of the present invention, the chloro-trifluoropropene refrigerant is essentially trans-1-chloro-3,3,3-trifluoropropene.

Another embodiment of the present invention is a process for producing cooling in a chiller system comprising compressing a refrigerant in a compressor, and evaporating the refrigerant in the vicinity of a body to be cooled, wherein said refrigerant comprises chloro-trifluoropropene.

In an embodiment of the present invention, the refrigerant of the present invention has an acoustic velocity close to that of R-123 or R-11, preferably where the acoustic velocity of the refrigerant of the present invention is within 10% of the acoustic velocity of R-123 or R-11 at conditions at the inlet of the compressor of the chiller system, in another embodiment of the present invention, the acoustic velocity of the refrigerant of the present invention is less than about 150 m/s at 40° C. and 1 bar, preferably less than about 145 m/s at 40° C. and 1 bar. In another embodiment of the present invention, the acoustic velocity of the refrigerant of the present invention is from about 130 to about 150 m/s at conditions of the compressor of the chiller system.

In addition to the chloro-trifluoropropene refrigerant of the present invention, the composition introduced into the system can include an additional refrigerant selected from hydrofluorocarbons, hydrochlorofluorocarbons, chlorofluorocarbons, hydrochloroolefins, hydrofluoroethers, fluoroketones, hydrocarbons, ammonia, or mixtures thereof, preferably where the additional refrigerant is non-flammable and/or the resulting refrigerant composition is non-flammable.

The hydrofluorocarbon can be selected from difluromethane (HFC-32), 1-fluoroethane (HFC-161), 1,1-difluoroethane (HFC-152a), 1,2-difluoroethane (HFC-152), 1,1,1-trifluoroethane (HFC-143a), 1,1,2-trifluoroethane (HFC-143), 1,1,1,2-tetrafluoroethane (HFC-134a), 1,1,2,2-tetrafluoroethane (HFC-134), pentafluoroethane (HFC-125), 1,1,1,2,3-pentafluoropropane (HFC-245eb), pentafluoropropane (HFC-245fa), 1,1,2,2,3-pentafluoropropane (HFC-245ca), 1,1,1,3,3,3-hexafluoropropane (HFC-236fa), 1,1,1,2,3,3,3-heptafluoropropane (HFC-227ea), 1,1,1,3,3-pentafluorbutane (HFC-365mfc), 1,1,1,2,3,4,4,5,5,5-decafluoropropane (HFC-4310) and mixtures thereof.

The hydrochlorofluorocarbon can be selected from 1,1-dichloro-2,2,2-trifluoroethane (R-123), 1-chloro-1,2,2,2-tetrafluoroethane (R-124), 1,1-dichloro-1-fluoroethane (R-141b). 1-chloro-1,1-difluoroethane (R-142b) and mixtures thereof preferably R-123.

The chlorofluorocarbons can be trichlorofluoromethane (R-11), dichlorodifluoromethane (R-12), 1,1,2-trichloro-1,2,2-trifluoroethane (R-113), 1,2-dichloro-1,1,2,2-tetrafluoroethane (R-114), chloropentafluoroethane (R-115), or mixtures thereof, preferably R-11.

Exemplary hydrofluoroethers include 1,1,1,2,2,3,3-heptafluoro-3-methoxy-propane, 1,1,1,2,2,3,3,4,4-nonafluoro-4-methoxy-butane, or mixtures thereof. An exemplary fluoroketone is 1,1,1,2,2,4,5,5,5-nonafluoro-4(trifluoromethyl)-3-pentanone.

The hydrofluoroolefins can be a C3 to C5 hydrofluoroolefin containing at least one fluorine atom, at least one hydrogen atom and at least one alkene linkage. Exemplary hydrofluoroolefins include 3,3,3-trifluoropropene (HFO-1234zf), E-1,3,3,3-tetrafluoropropene, (E-HFO-1234ze), Z-1,3,3,3-tetrafluoropropene CZ-FIFO-1234ze), 2,3,3,3-tetrafluoropropene (HFO-1234yf), E-1,2,3,3,-pentafluoropropene (E-HFO-1255ye), Z-1,2,3,3,3-pentafluoropropene (Z-HFO-125ye), E-1,1,1,3,3,3-hexafluorobut-2-ene (E-HFO-(336mzz), Z-1,1,1,3,3,3-hexafluorobut-2-ene (Z-FIFO-1336mzz), 1,1,1,4,4,5,5,5-octafluoropent-2-ene (HFO-1438mzz) or mixtures thereof.

An exemplary hydrochloroolefin is trans-1,2-dichloroethylene.

The hydrocarbons can C3 to C7 alkanes, preferably butanes, pentanes, or mixtures thereof, more preferably n-pentarie, isopentane, cyclopentane, or mixtures thereof.

Current chiller lubricants include, but are not hinted to, mineral oils, polyol ester oils, polyalkylene glycol oils, polyvinyl ether oils, poly(alphaolefin) oils, alkyl benzene oils and mixtures thereof. Preferred chiller lubricants are mineral oils, polyol ester oils, and polyvinyl ether oils. The chloro-trifluoropropenes of the present invention were found to be miscible with mineral oils as well as other chiller lubricants.

In addition to the chloro-trifluoropropene refrigerant miscible with the lubricant of the present invention, the composition introduced into the system can include other additives or materials of the type used in refrigerant compositions to enhance their performance in refrigeration systems. For example, the composition can include extreme pressure and antiwear additives, oxidation stability improvers, corrosion inhibitors, viscosity index improvers, pour and floc point depressants, antifoaming agents, viscosity adjusters, UV dyes, tracers, and the like.

The following non-limiting examples are hereby provided as reference:

EXAMPLES

Liquid Chiller Performance Data

The performance of the refrigerants R-123 (1,1-dichloro-2,2,2-trifluoroethane), R-1233zd (1-chloro-3,3,3-trifluoropropene, predominantly trans-isomer), and R-1234yf (2,3,3,3-tetrafluoropropene) in a liquid chiller application were evaluated in the following examples, in each example, data is provided at a given evaporator temperature and at multiple condenser temperatures, ranging from 30° C. to 55° C. The isentropic efficiency in each case was 0.7. Data for R-123 and R-1234yf are provided as comparative examples.

In the following examples, the following nomenclature is used:
Condenser discharge temperature: T cond
Condenser pressure: P cond
Evaporator pressure: P evap
Pressure difference between condenser and evaporator: P diff
Pressure ratio of the condenser to the evaporator: P ratio
Coefficient of Performance (energy efficiency): COP
Capacity: CAP

Example 1

In this example, the following conditions were used:
Evaporator temperature=−10° C. Compressor inlet temperature=−5° C. Isentropic efficiency=0.7. The results are tabulated in Table 1.

Figure 2:
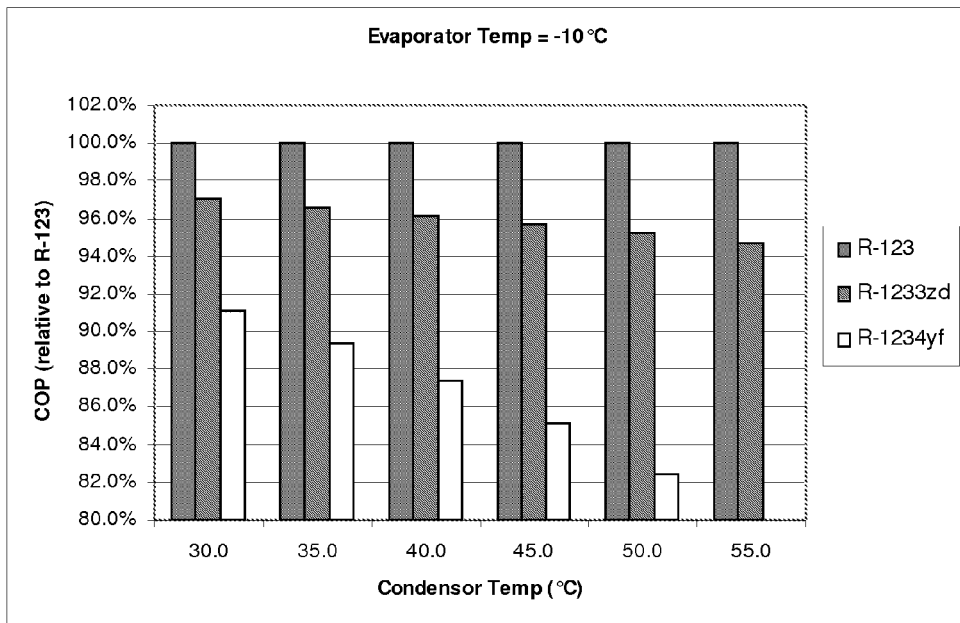
FIG. 2 is a chart of COP for R-123, R-1233zd, and R-1234yf at an evaporator temperature of −10° C.
Figure 3:
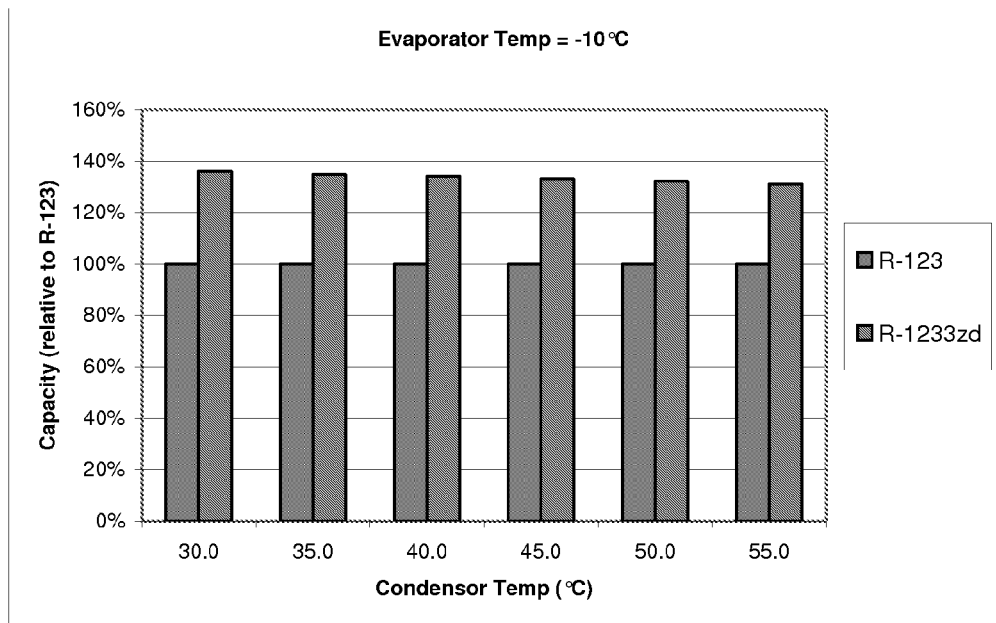
FIG. 3 is a chart of CAP for R-123, R-1233zd, and R-1234yf at an evaporator temperature of −10° C.

FIGS. 2 and 3 show the COP and CAP of R-1233zd and R-1234yf relative to R-123.

TABLE 1

T evap −10° C.
Internal heat exchanger
inlet compressor −5° C.
isentropic efficiency 0.7

|  | Tcond (° C.) | evap P (kPa) | cond P (kPa) | P diff (kPa) | P ratio (p/p) | CAP (KJ/m³) | COP |
|---|---|---|---|---|---|---|---|
| R-1234yf | 30.0 | 219 | 772 | 554 | 3.53 | 1456 | 3.6 |
|  | 35.0 | 219 | 882 | 663 | 4.03 | 1372 | 3.1 |
|  | 40.0 | 219 | 1003 | 785 | 4.58 | 1287 | 2.7 |
|  | 45.0 | 219 | 1137 | 918 | 5.19 | 1200 | 2.3 |
|  | 50.0 | 219 | 1283 | 1064 | 5.86 | 1111 | 2.0 |
|  | 55.0 | 219 | 1443 | 1224 | 6.59 | 1019 | 1.7 |
| R-1233zd | 30.0 | 28 | 155 | 127 | 5.51 | 280 | 3.9 |
|  | 35.0 | 28 | 184 | 156 | 6.54 | 269 | 3.4 |
|  | 40.0 | 28 | 217 | 189 | 7.71 | 257 | 2.9 |
|  | 45.0 | 28 | 254 | 226 | 9.04 | 245 | 2.6 |
|  | 50.0 | 28 | 296 | 268 | 10.52 | 233 | 2.3 |
|  | 55.0 | 28 | 343 | 314 | 12.18 | 222 | 2.1 |
| R-123 | 30.0 | 20 | 110 | 90 | 5.44 | 206 | 4.0 |
|  | 35.0 | 20 | 131 | 111 | 6.47 | 199 | 3.5 |
|  | 40.0 | 20 | 155 | 135 | 7.66 | 192 | 3.1 |
|  | 45.0 | 20 | 182 | 162 | 9.00 | 184 | 2.7 |
|  | 50.0 | 20 | 213 | 192 | 10.52 | 177 | 2.4 |
|  | 55.0 | 20 | 247 | 227 | 12.23 | 169 | 2.2 |

Example 2

In this example, the following conditions were used:
Evaporator temperature=0° C. Compressor inlet temperature=5° C. Isentropic efficiency=0.7. The results are tabulated in Table 2.

Figure 4:
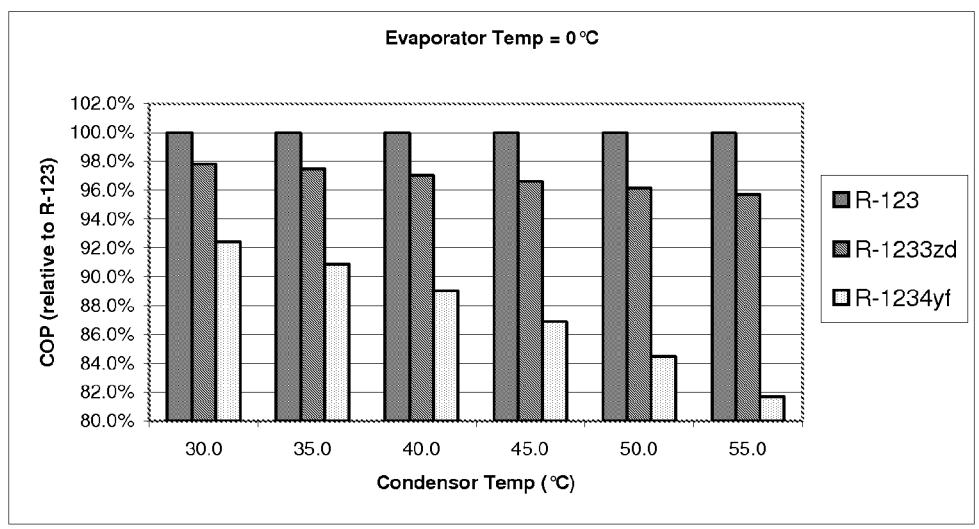
FIG. 4 is a chart of COP for R-123, R-1233zd, and R-1234yf at an evaporator temperature of 0° C.
Figure 5:
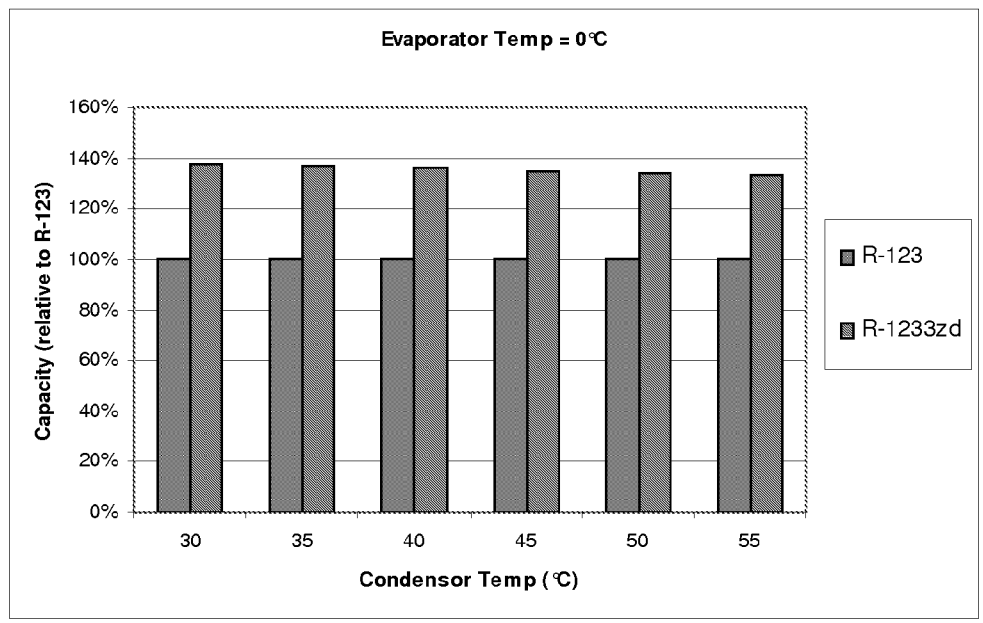
FIG. 5 is a chart of CAP for R-123, R-1233zd, and R-1234yf at an evaporator temperature of 0° C.

FIGS. 4 and 5 show the COP and CAP of R-1233zd and R-1234yf relative to R-123.

TABLE 2

T evap 0° C.
Internal heat exchanger
inlet compressor 5° C.
isentropic efficiency 0.7

|  | Tcond (° C.) | evap P (kPa) | cond P (kPa) | P diff (kPa) | P ratio (p/p) | CAP (KJ/m³) | COP |
|---|---|---|---|---|---|---|---|
| R-1234yf | 30.0 | 312 | 772 | 461 | 2.48 | 2152 | 5.3 |
|  | 35.0 | 312 | 882 | 570 | 2.83 | 2035 | 4.4 |
|  | 40.0 | 312 | 1003 | 691 | 3.22 | 1915 | 3.7 |
|  | 45.0 | 312 | 1137 | 825 | 3.64 | 1793 | 3.1 |
|  | 50.0 | 312 | 1283 | 971 | 4.11 | 1668 | 2.7 |
|  | 55.0 | 312 | 1443 | 1131 | 4.62 | 1540 | 2.3 |
| R-1233zd | 30.0 | 46 | 155 | 109 | 3.37 | 463 | 5.6 |
|  | 35.0 | 46 | 184 | 138 | 4.00 | 444 | 4.7 |
|  | 40.0 | 46 | 217 | 171 | 4.72 | 426 | 4.0 |
|  | 45.0 | 46 | 254 | 208 | 5.53 | 407 | 3.5 |
|  | 50.0 | 46 | 296 | 250 | 6.43 | 389 | 3.0 |
|  | 55.0 | 46 | 343 | 297 | 7.45 | 370 | 2.7 |
| R-123 | 30.0 | 33 | 110 | 77 | 3.36 | 337 | 5.7 |
|  | 35.0 | 33 | 131 | 98 | 4.00 | 325 | 4.8 |
|  | 40.0 | 33 | 155 | 122 | 4.74 | 314 | 4.1 |
|  | 45.0 | 33 | 182 | 149 | 5.57 | 302 | 3.6 |
|  | 50.0 | 33 | 213 | 180 | 6.51 | 290 | 3.1 |
|  | 55.0 | 33 | 247 | 215 | 7.56 | 279 | 2.8 |

Example 3

In this example, the following conditions were used:
Evaporator temperature=5° C. Compressor inlet temperature=10° C. Isentropic efficiency=0.7. The results are tabulated in Table 3.

Figure 6:
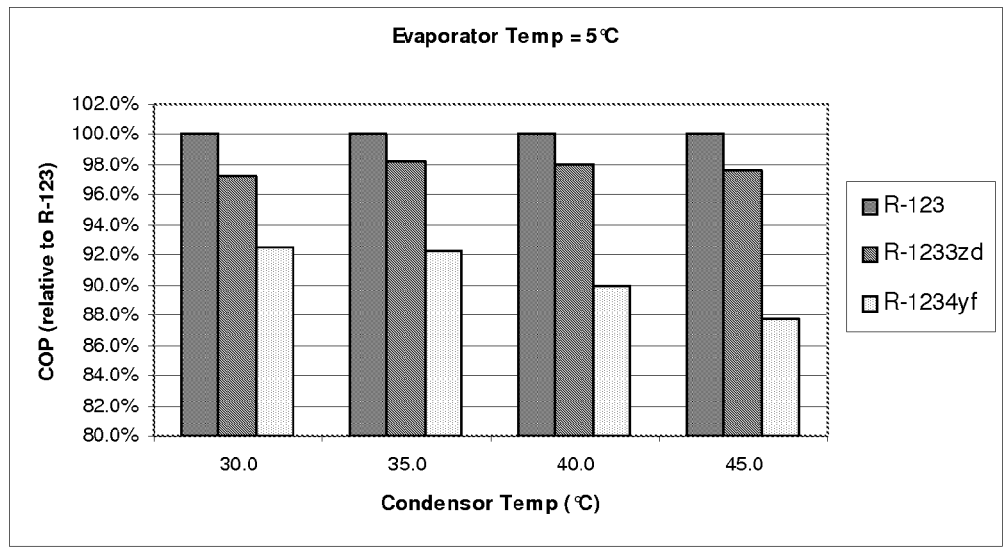
FIG. 6 is a chart of COP for R-123, R-1233zd, and R-4234yf at an evaporator temperature of 5° C.
Figure 7:
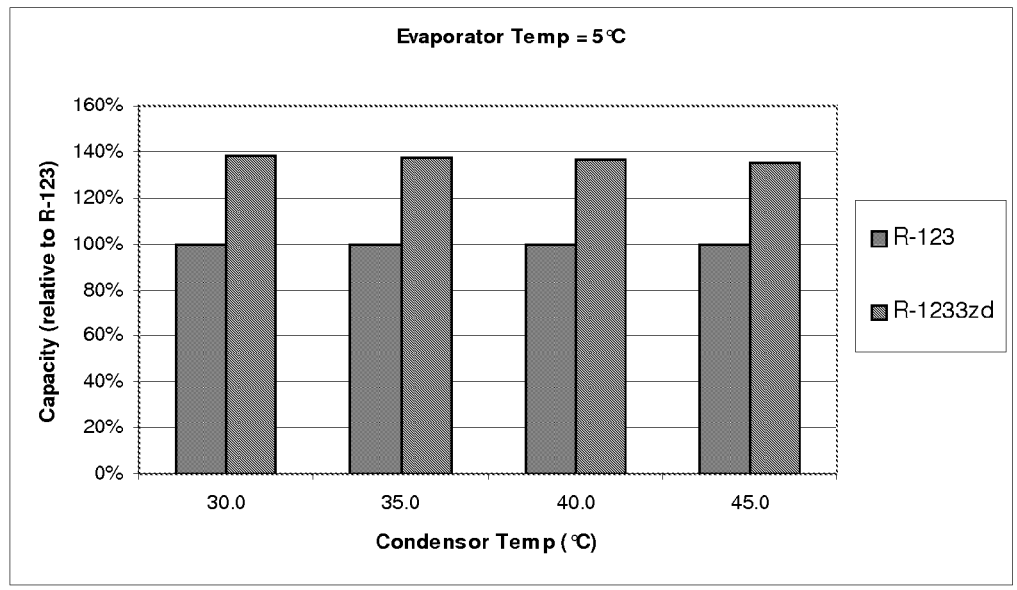
FIG. 7 is a chart of CAP for R-123, R-1233zd, and R-1234yf at an evaporator temperature of 5"C.

FIGS. 6 and 7 show the COP and CAP of R-1233zd and R-1234yf relative to R-123.

TABLE 3

T evap 5° C.
internal heat exchanger
inlet compressor 10° C.
isentropic efficiency 0.7

|  | Tcond (° C.) | evap P (kPa) | cond P (kPa) | P diff (kPa) | T-out comp | CAP (KJ/m³) | COP |
|---|---|---|---|---|---|---|---|
| R-1234yf | 30.0 | 368 | 772 | 404 | 39 | 2610 | 6.7 |
|  | 35.0 | 368 | 882 | 514 | 45 | 2472 | 5.4 |
|  | 40.0 | 368 | 1003 | 635 | 51 | 2332 | 4.4 |
|  | 45.0 | 368 | 1136 | 768 | 56 | 2188 | 3.7 |
| R-1233zd | 30.0 | 58 | 154 | 96 | 44 | 585 | 7.0 |
|  | 35.0 | 58 | 183 | 125 | 50 | 562 | 5.7 |
|  | 40.0 | 58 | 216 | 158 | 55 | 539 | 4.8 |
|  | 45.0 | 58 | 254 | 196 | 61 | 516 | 4.1 |
| R-123 | 30.0 | 41 | 110 | 69 | 44 | 423 | 7.2 |
|  | 35.0 | 41 | 131 | 90 | 50 | 409 | 5.8 |
|  | 40.0 | 41 | 155 | 114 | 56 | 395 | 4.9 |
|  | 45.0 | 41 | 182 | 141 | 61 | 381 | 4.2 |

Example 4

In this example, the following conditions were used:
Evaporator temperature=10° C. Compressor inlet temperature=15° C. Isentropic efficiency=0.7. The results are tabulated in Table 4.

Figure 8:
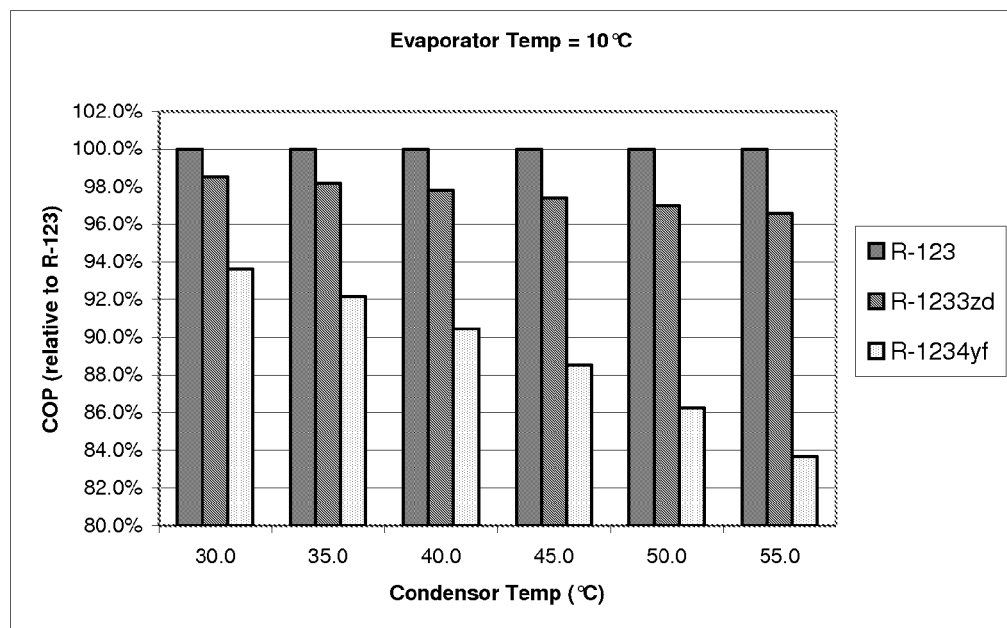
FIG. 8 is a chart of COP for R-123, R-1233zd, and R-1234yf at an evaporator temperature of 10° C.
Figure 9:
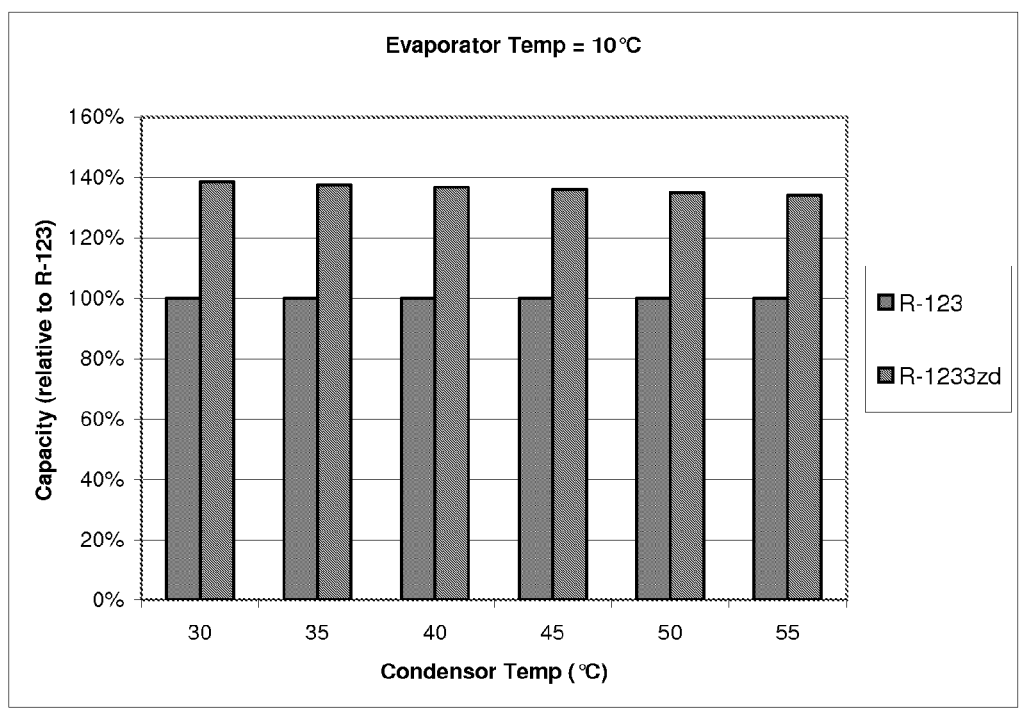
FIG. 9 is a chart of CAP for R-123, R-1233zd, and R-1234yf at an evaporator temperature of 10° C.

FIGS. 8 and 9 show the COP and CAP of R-1233zd and R-1234yf relative to R-123.

TABLE 4

T evap 10° C.
internal heat exchanger
inlet compressor 15° C.
isentropic efficiency 0.7

|  | Tcond (° C.) | evap P (kPa) | cond P (kPa) | P diff (kPa) | P ratio (p/p) | CAP (KJ/m³) | COP |
|---|---|---|---|---|---|---|---|
| R-1234yf | 30.0 | 432 | 772 | 340 | 1.79 | 3097 | 8.7 |
|  | 35.0 | 432 | 882 | 450 | 2.04 | 2936 | 6.7 |
|  | 40.0 | 432 | 1003 | 571 | 2.32 | 2773 | 5.4 |
|  | 45.0 | 432 | 1137 | 705 | 2.63 | 2606 | 4.4 |
|  | 50.0 | 432 | 1283 | 851 | 2.97 | 2435 | 3.7 |
|  | 55.0 | 432 | 1443 | 1011 | 3.34 | 2258 | 3.1 |
| R-1233zd | 30.0 | 72 | 155 | 83 | 2.16 | 731 | 9.1 |
|  | 35.0 | 72 | 184 | 112 | 2.57 | 703 | 7.1 |
|  | 40.0 | 72 | 217 | 145 | 3.03 | 674 | 5.8 |
|  | 45.0 | 72 | 254 | 182 | 3.55 | 646 | 4.8 |
|  | 50.0 | 72 | 296 | 224 | 4.13 | 618 | 4.1 |
|  | 55.0 | 72 | 343 | 271 | 4.78 | 591 | 3.6 |
| R-123 | 30.0 | 51 | 110 | 59 | 2.17 | 528 | 9.3 |
|  | 35.0 | 51 | 131 | 80 | 2.58 | 510 | 7.3 |
|  | 40.0 | 51 | 155 | 104 | 3.05 | 493 | 5.9 |
|  | 45.0 | 51 | 182 | 131 | 3.59 | 475 | 5.0 |
|  | 50.0 | 51 | 213 | 162 | 4.19 | 458 | 4.3 |
|  | 55.0 | 51 | 247 | 196 | 4.88 | 440 | 3.7 |

Representative data from Tables 1 through 4 is charted in FIGS. 2 through 9.

In all of these examples, the efficiency of R-1233zd was very close to that of R-123, being within a few percent of the efficiency of R-123. In contrast, the efficiency of R-1234yf was significantly lower than that of R-1233zd and R-123, being from 6.4% lower to over 20% lower than that of R-123. It was also unexpectedly discovered that the capacity of R-1233rd was from 30% to 40% greater than that of R-123.

It is also shown that for R-1233zd and for R-123 the system is operated as a negative-pressure system, where the pressure in the evaporator is below ambient. For R-1234yf the entire system is operated at positive-pressure.

R-1233zd was found to provide a close match to operating pressures, pressure ratio, and pressure difference of R-123 and can be used as a more environmentally acceptable replacement.

Example 5

Liquid Chiller Performance Data for Trans-1233zd and Cis-1233zd

The performance of cis and trans 1233zd in a single-stage liquid chiller was evaluated in the following examples. In each example, data is provided at a given evaporator temperature and at multiple condenser discharge temperatures, ranging from 30° C. to 45° C. In each case, there is 5° C. of evaporator superheat and 5° C. of condenser subcooling. The isentropic compressor efficiency in each case was 0.7.

In the following examples, the following nomenclature is used:
Evaporator temperature: T evap
Condenser discharge temperature: T cond
Condenser pressure: cond P
Evaporator pressure: evap P
Coefficient of Performance (energy efficiency): COP
Capacity: CAP The trans-1233zd (1-chloro-3,3,3-trifluoropropene, >99% trans-isomer) and cis-1233zd (cis-1-chloro-3,3,3-trifluoropropene, >99% cis-isomer) are evaluated for use in a single-stage chiller as explained above. The results are shown in Tables 5 to 8.

TABLE 5

Evaporator Temperature = −10° C.

|  | Tcond (° C.) | evap P (kPa) | cond P (kPa) | CAP (KJ/m³) | COP |
|---|---|---|---|---|---|
| trans-1233zd | 30.0 | 31 | 154 | 308 | 4.12 |
|  | 35.0 | 31 | 182 | 297 | 3.58 |
|  | 40.0 | 31 | 214 | 286 | 3.14 |
|  | 45.0 | 31 | 250 | 274 | 2.78 |
| cis-1233zd | 30.0 | 12 | 75 | 134 | 4.08 |
|  | 35.0 | 12 | 91 | 128 | 3.53 |
|  | 40.0 | 12 | 109 | 123 | 3.09 |
|  | 45.0 | 12 | 130 | 117 | 2.73 |

TABLE 6

Evaporator Temperature = 0° C.

|  | Tcond (° C.) | evap P (kPa) | cond P (kPa) | CAP (KJ/m³) | COP |
|---|---|---|---|---|---|
| trans-1233zd | 30.0 | 49 | 154 | 492 | 5.92 |
|  | 35.0 | 49 | 182 | 475 | 4.97 |
|  | 40.0 | 49 | 214 | 457 | 4.25 |
|  | 45.0 | 49 | 250 | 440 | 3.69 |
| cis-1233zd | 30.0 | 20 | 75 | 230 | 5.90 |
|  | 35.0 | 20 | 91 | 221 | 4.94 |
|  | 40.0 | 20 | 109 | 212 | 4.21 |
|  | 45.0 | 20 | 130 | 203 | 3.84 |

TABLE 7

Evaporator Temperature = 5° C.

|  | Tcond (° C.) | evap P (kPa) | cond P (kPa) | CAP (KJ/m³) | COP |
|---|---|---|---|---|---|
| trans-1233zd | 30.0 | 60 | 154 | 613 | 7.37 |
|  | 35.0 | 60 | 182 | 592 | 6.02 |
|  | 40.0 | 60 | 214 | 571 | 5.05 |
|  | 45.0 | 60 | 250 | 549 | 4.32 |
| cis-1233zd | 30.0 | 26 | 75 | 296 | 7.36 |
|  | 35.0 | 26 | 91 | 285 | 6.00 |
|  | 40.0 | 26 | 109 | 274 | 5.02 |
|  | 45.0 | 26 | 130 | 262 | 4.28 |

TABLE 8

Evaporator Temperature = 10° C.

|  | Tcond (° C.) | evap P (kPa) | cond P (kPa) | CAP (KJ/m³) | COP |
|---|---|---|---|---|---|
| trans-1233zd | 30.0 | 74 | 154 | 757 | 9.54 |
|  | 35.0 | 74 | 182 | 732 | 7.49 |
|  | 40.0 | 74 | 214 | 706 | 6.11 |
|  | 45.0 | 74 | 250 | 680 | 5.12 |
| cis-1233zd | 30.0 | 32 | 75 | 378 | 9.55 |
|  | 35.0 | 32 | 91 | 364 | 7.48 |
|  | 40.0 | 32 | 109 | 350 | 6.09 |
|  | 45.0 | 32 | 130 | 336 | 5.09 |

The COP of trans-1233zd is about the same or greater than cis-1233zd while the capacity of trans-1233zd is about twice that or more than cis-1233zd.

Example 6

Mixtures of Trans-1233zd and cis-1233zd

To examine the potential effect of a mixture of both trans- and cis-isomers on the performance or operation of a centrifugal chiller, a vapor-liquid equilibrium test on a mixture of trans-1233zd and cis-1233zd was conducted to evaluate the potential for fractionation.

To a clean, glass 35 mL sampling vial was added 4.0 gram of cis-1233zd and 16.1 gram of trans-1233zd, providing an overall ratio of cis-1233zd-to-trans-1233zd of 19.9/80.1 wt/wt. The mixture was left to equilibrate to room temperature. The vapor portion and the liquid portion were analyzed by Gas Chromatography (GC). The ratio of cis-to-trans isomers in the vapor portion was found to be 12.2/87.8 wt/wt; the ratio of cis-1233zd-to-trans-1233zd in the liquid portion was significantly different, and found to be 21.3/78.6 wt/wt. This exemplifies that mixtures of trans-1233zd and cis-1233zd may fractionate as is a zeotropic mixture.

Example 7

Acoustic Velocity

The acoustic velocity for R-11, R-123, R-134a, R-1233zd and R-1234yf were determined at 40° C. and 1 bar. The acoustic velocity of R-1233zd is close to that of R-11 and closer to that of R-123 than either R-134a or R-1234yf.

TABLE 9

Acoustic Velocity of Refrigerants
Conditions: 40° C. and 1 bar.

| Refrigerant | Acoustic Velocity (m/s) |
|---|---|
| R123 | 131.9 |
| R-11 | 142.0 |
| R-1233zd | 143.7 |
| R-1234yf | 155.6 |
| R-134a | 165.7 |

Example 8

Dimensionless Specific Speed

The performance of R-123, R-1233zd, and R-1234yf in a liquid chiller was determined as in example 2, with a compressor inlet temperature at 5° C. and a condenser temperature at 40° C. The results are shown in Table 10, which also gives the ratio of the dimensionless specific speed, of the refrigerant to that of R-123 ($\Omega_{123}$), assuming the chillers are operated to deliver the same capacity of cooling. R-1233zd was found to be a good replacement for R-123 as compared to R-1234yf.

TABLE 10

Dimensionless Specific Speed of
Refrigerants at Equivalent Cooling Capacity
Evaporator Temp: 5° C. Condenser Temp: 40° C.

| Refrigerant | Compressor | P (bar) | Temp (° C.) | $\Omega/\Omega_{123}$ |
|---|---|---|---|---|
| R123 | inlet | 0.33 | 5 | 1 |
| | outlet | 1.55 | 58 | |
| R-1233zd | inlet | 0.46 | 5 | 0.76 |
| | outlet | 2.17 | 58 | |
| R-1234yf | inlet | 3.12 | 5 | 0.44 |
| | outlet | 10.03 | 52 | |

These results show that R-1233, particularly R-1233zd is useful as a refrigerant for liquid chillers, particularly negative-pressure chillers, and especially in large systems due to the efficiency benefits of R-1233zd over R-1234yf or similar refrigerants.

The invention claimed is:

1. A chiller system comprising a compressor, at least one liquid cooler, at least one condenser, and a refrigerant; wherein said compressor is a centrifugal compressor and said refrigerant comprises 1-chloro-3,3,3-trifluoropropene, and where in the 1-chloro-3,3,3-trifluoropropene comprises greater than 70 wt % the trans-isomer.

2. The chiller system of claim 1 wherein said compressor is a multistage compressor.

3. The chiller system of claim 2 wherein said multistage compressor is a centrifugal compressor with 2 or 3 stages.

4. The chiller system of claim 1 wherein said compressor is an oil-free compressor.

5. The chiller system of claim 1 wherein said liquid cooler is a flooded evaporated.

6. The chiller system of claim 1 wherein said compressor contains a lubricant.

7. The chiller system of claim 1 wherein said at least one condenser comprises at least one water-cooled condenser.

8. The chiller system of claim 1 wherein said at least one condenser comprises at least one air-cooled condenser.

9. The chiller system of claim 1 wherein one of said at least one condensers of the chiller system is operated at temperatures ranging from about 26.7° C. (80° F.) to 60° C. (140° F.).

10. The chiller system of claim 1 wherein said chiller system is a heat recovery chiller system.

11. The heat recovery chiller system of claim 10 wherein heat is recovered from water leaving said at least one water-cooled condenser.

12. The heat recovery chiller system of claim 10 wherein heat is recovered from said refrigerant.

13. The chiller system of claim 6 wherein said lubricant is selected from the group consisting of mineral oils, polyol ester oils, polyalklylene glycol oils, polyvinyl ether oils, poly(alphaolefin) oils, alkyl benzene oils and mixtures thereof.

14. The chiller system of claim 6 wherein said lubricant is selected from the group consisting of mineral oils, polyol ester oils, polyvinyl ether oils, alkyl benzene oils and mixtures thereof.

15. The chiller system of claim 1 wherein said 1-chloro-3,3,3-trffluoropropene is greater than 90 wt % trans-isomer.

16. The chiller system of claim 1 wherein said 1-chloro-3,3,3-trifluoropropene is greater than 97 wt % trans-isomer.

17. The chiller system of claim 1 wherein said 1-chloro-3,3,3-trifluoropropene is greater than 99 wt % trans-isomer.

18. The chiller system of claim 1 wherein said 1-chloro-3,3,3-trifluoropropene is essentially the trans-isomer.

19. The chiller system of claim 1 wherein said refrigerant further comprises a hydrofluoroolefin, hydrofluorocarbon, a hydrochlorofluorocarbon, a chlorofluorocarbon, hydrochlorofluoroolefin, a fluoroketone, a hydrofluoroether, a hydrocarbon, ammonia, and mixtures thereof.

20. A method of producing cooling using a chiller system of claim 1.

21. The method of producing cooling of claim 20 wherein said at least one liquid cooler is a flooded evaporator operated with one portion operated at a pressure below atmospheric pressure.

22. A process for producing cooling in a chiller system comprising compressing a refrigerant in a compressor, and evaporating the refrigerant in the vicinity of a body to be cooled, wherein said refrigerant comprises 1-chloro-3,3,3-trifluoropropene, and where in the 1-chloro-3,3,3-trifluoropropene comprises greater than 70 wt % trans-isomer.

23. A method of producing heating using a chiller system of claim 7.

24. The method of producing heating of claim 23 wherein said liquid cooler is a flooded evaporator is operated with one portion operated at a pressure below atmospheric pressure.

25. A process for producing heating in a chiller system comprising compressing a refrigerant in a compressor, and condensing the refrigerant in the vicinity of a body to be heated, wherein said refrigerant comprises 1-chloro-3,3,3-trifluoropropene, and where in the 1-chloro-3,3,3-trifluoropropene comprises greater than 70 wt % trans-isomer.

* * * * *